US006032712A

United States Patent [19]

Biagiotti

[11] Patent Number: 6,032,712

[45] Date of Patent: Mar. 7, 2000

[54] EMBOSSING AND LAMINATING MACHINE AND METHOD WITH CYLINDERS WITH DISTRIBUTED CONTACT AREAS

[75] Inventor: Guglielmo Biagiotti, Lucca, Italy

[73] Assignee: Fabio Perini, S.p.A., Lucca, Italy

[21] Appl. No.: 09/077,234

[22] PCT Filed: Dec. 6, 1996

[86] PCT No.: PCT/IT96/00240

§ 371 Date: May 26, 1998

§ 102(e) Date: May 26, 1998

[87] PCT Pub. No.: WO97/20689

PCT Pub. Date: Jun. 12, 1997

[30] Foreign Application Priority Data

Dec. 5, 1995 [IT] Italy .................................. F195A0248

[51] Int. Cl.[7] ..................................................... B29C 59/04

[52] U.S. Cl. .......................... 156/358; 156/553; 156/582; 156/209; 156/290

[58] Field of Search .................................... 156/209, 219, 156/290, 358, 553, 582; 264/284; 425/385; 162/109, 116, 117, 362

[56] References Cited

U.S. PATENT DOCUMENTS

| | | | |
|---|---|---|---|
| 3,414,459 | 12/1968 | Wells . | |
| 3,961,119 | 6/1976 | Thomas . | |
| 4,742,968 | 5/1988 | Young, Jr. et al. | 242/541.7 |
| 5,096,527 | 3/1992 | Biagiotti | 156/209 |
| 5,667,619 | 9/1997 | Alikhan | 156/209 |

FOREIGN PATENT DOCUMENTS

| | | |
|---|---|---|
| 0 370 972 A1 | 5/1990 | European Pat. Off. . |
| 0 426 548 B1 | 11/1994 | European Pat. Off. . |

OTHER PUBLICATIONS

PCT/IT 96/00240 International Search Report.

*Primary Examiner*—Michael W. Ball
*Assistant Examiner*—Michael A Tolin
*Attorney, Agent, or Firm*—Leydig, Voit & Mayer, Ltd.

[57] ABSTRACT

An embossing and laminating machine is provided comprising a first embossing cylinder with a surface provided with a first set of protuberances and a second embossing cylinder with a surface provided with a second set of protuberances. The two embossing cylinders forming a nip. First and second pressure rollers interact with the first and the second embossing cylinders respectively. The protuberances are constructed in such a way that in the nip some of the protuberances of the first set coincide with some protuberances of the second set while other protuberances of the first set are out of phase with corresponding protuberances of the second set.

12 Claims, 7 Drawing Sheets

FIG. 1
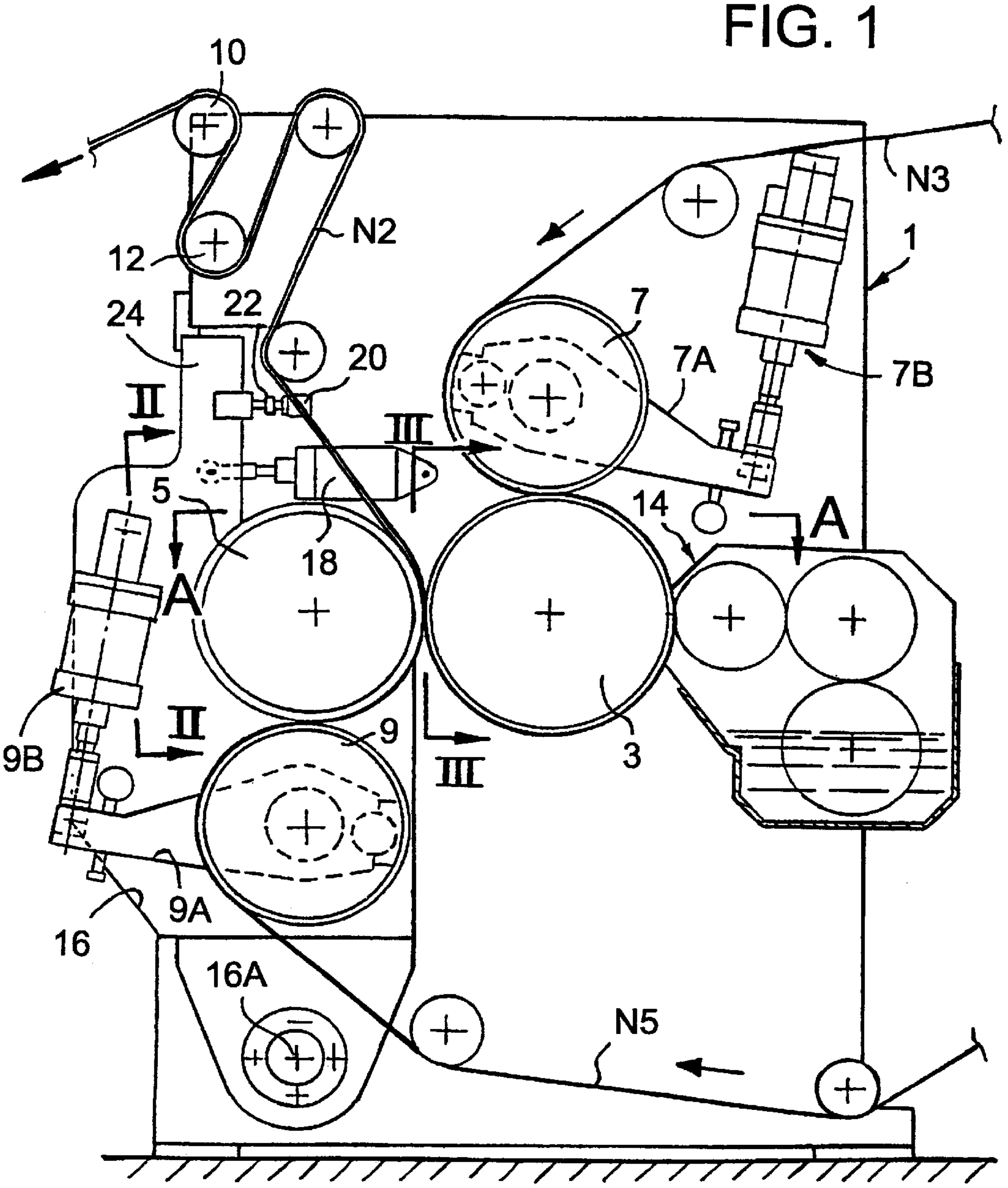
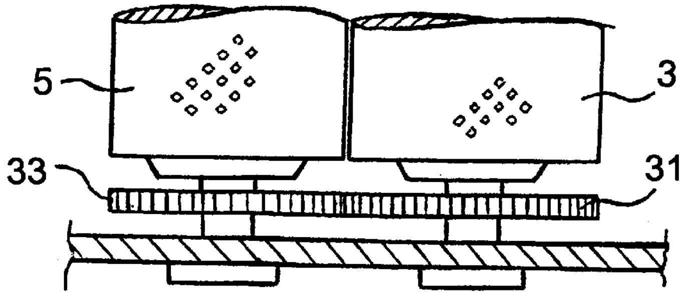
FIG. 1A

EMBOSSING AND LAMINATING MACHINE AND METHOD WITH CYLINDERS WITH DISTRIBUTED CONTACT AREAS

TECHNICAL FIELD

The invention relates to an embossing and laminating machine comprising a first embossing cylinder with a surface provided with a first set of protuberances, a second embossing cylinder with a surface provided with a second set of protuberances, the said two embossing cylinders forming a nip, and a first and a second pressure roller interacting with the first and the second embossing cylinder respectively; and in which the protuberances of the said first and the said second sets are made in such a way that in the said nip some of the protuberances of the first set coincide with some protuberances of the second set, while other protuberances of the first set are out of phase with corresponding protuberances of the second set.

PRIOR ART

Embossing machines are commonly used for the processing of paper layers in order to form a semi-finished product intended for the production of rolls of toilet paper, rolls of kitchen towels, tissues, paper serviettes, and the like.

A device and a method of the conventional type are described, for example, in EP-B-0,370,972.

These devices are commonly provided with two symmetrical embossing cylinders of the same diameter such that, in the area of closest approach of the two cylinders, where they are virtually in contact with each other, and where two layers are joined by means of pressure and gluing in order to form a composite strip material, there is an exact correspondence between the protuberances of one cylinder and the protuberances of the other cylinder. Basically, the protuberances of one cylinder are disposed according to a right-hand spiral and the protuberances of the other cylinder are disposed according to a left-hand spiral, the spirals having equal but opposite inclinations with respect to the axes of the corresponding cylinders. This produces a strip product in which the protuberances of one layer coincide with those of the other layer and adhere to them, the protuberances being pressed against each other after an adhesive has been applied to the protuberances of one of the layers.

To overcome certain problems which arise when cylinders provided with very small and very closely-packed protuberances are used, it has been proposed (EPA-0,426,548) that two layers should be embossed with different patterns, in other words patterns in which in at least one direction of alignment the protuberances of one layer have a different interval from that of the protuberances disposed in the same direction on the other layer. In this way a strip is obtained in which the layers are in contact with each other in restricted areas and not over the whole area of the strip. In this way, there is the advantage that the two embossing cylinders do not have to be perfectly in phase in order to achieve exact correspondence between all the points, something which is particularly difficult once the dimensions of the points have been reduced.

In practice, only some of the protuberances of one embossing cylinder correspond to the protuberances of the other cylinder in the nip between the two embossing cylinders through which the strip of paper is made to pass in order to join and laminate the two layers from which it is formed. Thus there are areas on both embossing cylinders in which the protuberances are subjected to mechanical stresses (where the layers are joined) and large areas where the protuberances are not subject to stresses (where there is no reciprocal correspondence between the protuberances of the two cylinders).

The pressure exerted on the two layers during lamination between the embossing cylinders is considerable. When, as in EP-A-0,426,548, the areas of contact are reduced, there is a concentration of the stresses, an increase in the specific pressure and consequently a gradual and concentrated crushing of the material constituting the protuberances in the areas of contact.

Indeed, it has been found that the embossing cylinders made to produce a strip material as described in EP-A-0, 426,548 deteriorate far more rapidly than conventional embossing cylinders designed to operate with exact coincidence between all the protuberances of one cylinder and the protuberances of the other cylinder in the lamination area, and a consequent distribution of the stresses over a large surface area.

DISCLOSURE OF INVENTION

The object of the present invention is to produce an embossing and laminating machine which requires no phase matching between the embossing cylinders and which at the same time eliminates the disadvantage of having the crushing action always concentrated on the same protuberances on the cylinders.

In essence, and in contrast with the prior art, the invention envisages that the two embossing cylinders, even though they are actuated at the same peripheral speed, have slightly different diameters. In this way, the protuberances of the two embossing cylinders that interact with each other as the layers are joined together vary continuously as a result of the different angular speed of the two cylinders, so that all the protuberances on each cylinder are at some stage brought into play and are consequently stressed and therefore deteriorate in a uniform manner.

This ensures a much longer service life of the embossing cylinders, not only because the pressure -which is spread over all the protuberances—causes slower deterioration, but also because a greater degree of crushing of the protuberances can be tolerated. In systems in which the protuberances are deformed in certain areas, the crushing of the working protuberances soon becomes such that correct lamination of the layers is no longer possible without the reciprocal interference of the non-deteriorated protuberances, but this is not the case with the embossing machine according to the invention, in which the crushing is uniform over the whole cylinder and can therefore be easily compensated by reducing the gap between the embossing cylinders. Concentrated crushing in certain areas also causes serious problems as far as applying glue to the layers is concerned. This is because, when the areas of contact between the cylinders become lower as a result of being crushed, the layer supported on the cylinder does not receive any glue in these areas, and therefore the two layers are not joined together. A limited difference in height between the protuberances in the area of contact between the embossing cylinders is sufficient for adhesion to be lost between the layers leaving the embossing machine.

Further advantageous characteristics of the embossing machine according to the invention are indicated in the following description and in the attached claims.

BRIEF DESCRIPTION OF THE DRAWINGS

The invention will be more clearly understood from the description and the attached drawing, which shows a practical and non-restrictive example of the invention. In the drawing:

FIG. 1 is a diagram of the embossing and laminating machine;

FIG. 1A is a localized partial section through the line A—A in FIG. 1;

DETAILED DESCRIPTION OF EMBODIMENTS OF THE INVENTION

Figure 2:
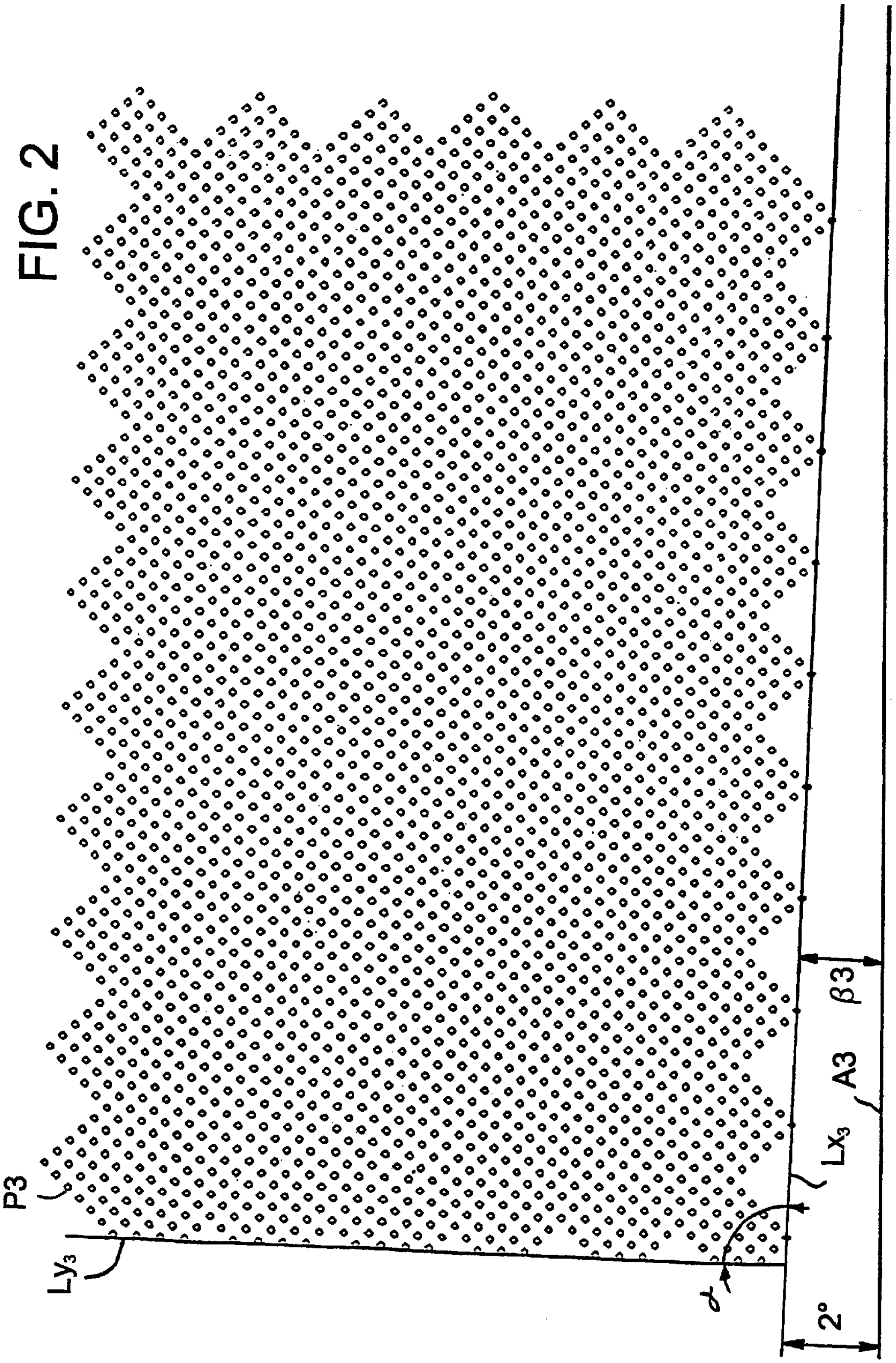
FIGS. 2 and 3 are two views, through II—II and III—III in FIG. 1 respectively, of a portion of the plane development of the cylindrical surfaces of: the two embossing cylinders, in a possible embodiment.

With reference to FIG. 1, an embossing and laminating machine, indicated by the number 1, will be described initially in a summary way.

Two embossing cylinders 3 and 5, disposed with parallel axes and having their surfaces provided with protuberances for embossing, are mounted on the frame of the machine 1. In the nip formed by the two cylinders 3 and 5, the protuberances (or rather some of them, as will be explained subsequently) are in contact with each other.

The embossing cylinder 3 interacts with a pressure roller 7 which may also be provided with an embossed surface, or may be covered with a yielding material such as rubber or the like. The number 9 indicates a second pressure roller similar to the roller 7 and interacting with the embossing cylinder 5. The two pressure rollers 7 and 9 are mounted on corresponding moving elements 7A and 9A which are hinged and subject to an elastic force, for example through two cylinder and piston systems 7B, 9B which press the corresponding pressure rollers against the corresponding embossing cylinders 3 and 5.

N3 and N5 indicate two layers of paper material or the like which are fed between the embossing cylinder 3 and the pressure roller 7 and between the embossing cylinder 5 and the pressure roller 9 respectively, so that they are embossed separately. The two embossed layers remain engaged with the corresponding embossing cylinders 3 and 5 and, after an adhesive has been applied by the unit 14 to the protuberances of the layer N3, are joined together in the nip between the two embossing cylinders 3 and 5, where the protuberances of one embossing cylinder move at a distance which is less than the combined thickness of the two layers N3 and N5 from the protuberances of the other embossing cylinder. In this way the necessary pressure for gluing the two layers and for forming a double strip material N2 is obtained, after which the material is removed by return rollers 10 and 12, or by another known method, to be subjected to further processing on a production line, for example winding into rolls.

The two embossing cylinders 3 and 5 are made with protuberances P3 and P5 distributed in such a way that, in the area where the layers are joined, only some of the protuberances P3 coincide with corresponding protuberances P5, while in the other areas there is no coincidence.

This may be done in a known way, by distributing the protuberances as described in EP-A-0,426,548, in other words by forming the protuberances on one cylinder with an interval different from the interval of the protuberances on the other cylinder. However, this has the disadvantage that the two embossing cylinders have to be machined with different tools.

Alternatively, the two embossing cylinders 3, 5 may be made in such a way that they have the same pattern embossed on both cylinders, but disposed at inclinations such that there is no superimposition, in other words correspondence, between all the protuberances of one cylinder and all the protuberances of the other cylinder, but there is superimposition or coincidence in certain areas.

Figure 3:
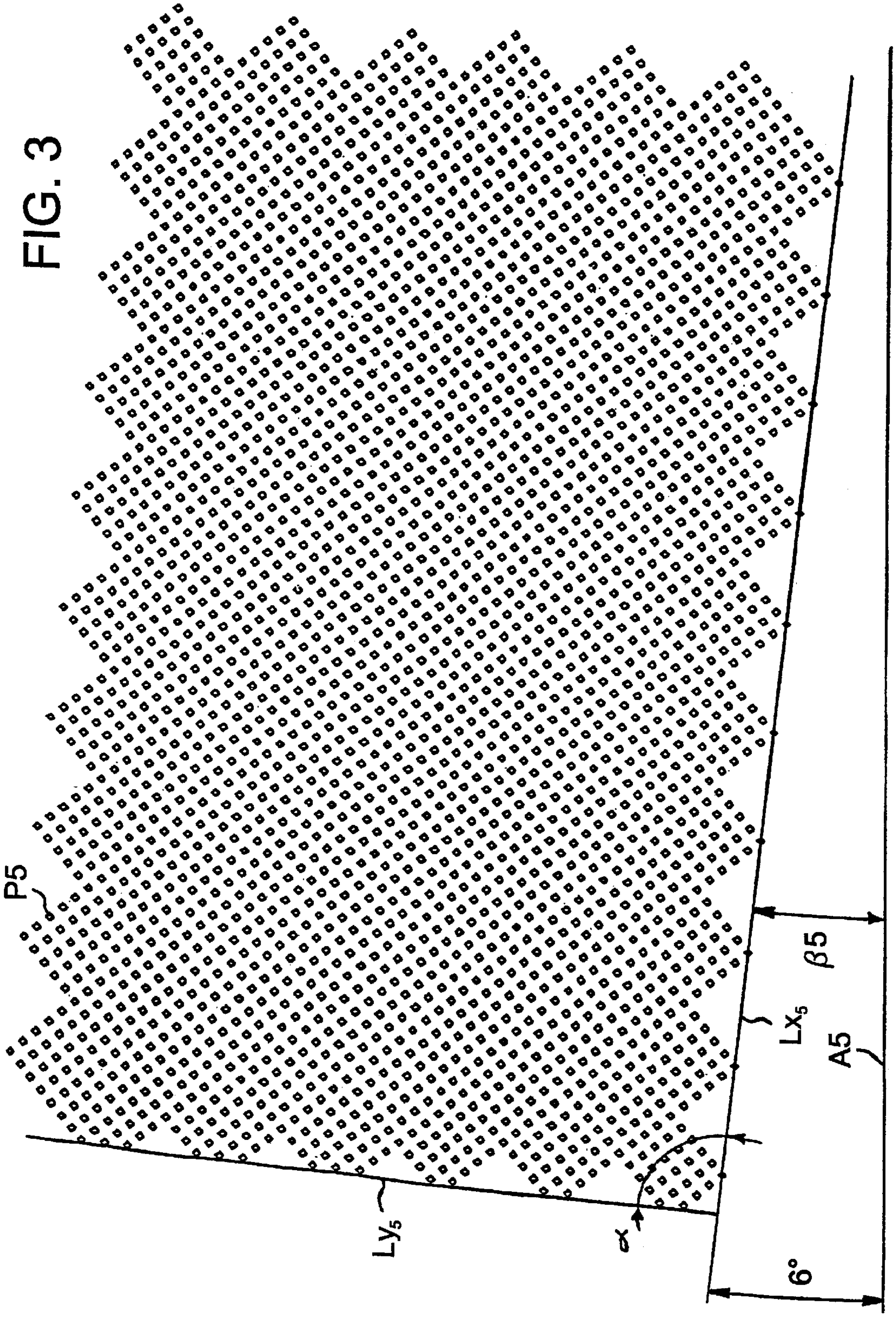

For this purpose, according to a first embodiment, when the two embossing cylinders 3 and 5 are viewed from the same side (lines II—II and III—III in FIG. 1) they show two sets of protuberances (a first set on the embossing cylinder 3 and a second set on the embossing cylinder 5), represented in partial plane development in FIGS. 2 and 3.

The protuberances P3 of the first set (embossing cylinder 3) are aligned in a first and second direction of alignment indicated by $Lx_3$ and $Ly_3$, forming between them an angle $\alpha$ other than zero. In the example illustrated in FIG. 2, the protuberances P3 are disposed with the same interval along $Lx_3$ and along $Ly_3$, but this need not be so. The direction $Lx_3$ forms an angle $\beta_3$ of 2° with the direction of the axis A3 of the first embossing cylinder 3.

The protuberances P5 of the second set, on the embossing cylinder 5, are aligned in a third and fourth direction of alignment, indicated by $Lx_5$ and $Ly_5$ in FIG. 3. The directions of alignment $Lx_3$ and $Ly_5$ form between them the same angle $\alpha$ (or at least an angle very close to $\alpha$, for example with a variation of approximately 1–3°), and are orientated in the same direction with respect to the axis A5 of the embossing cylinder 5. The direction $Lx_5$ is inclined downwards from left to right in FIG. 3, as is the direction $Lx_3$ in FIG. 2. The angle $\beta_5$ formed by the third direction of alignment $Lx_5$ with the axis A5 of the embossing cylinder 5 is, in this embodiment, different from the angle $\beta_5$ and is equal to 6°.

Figure 4:
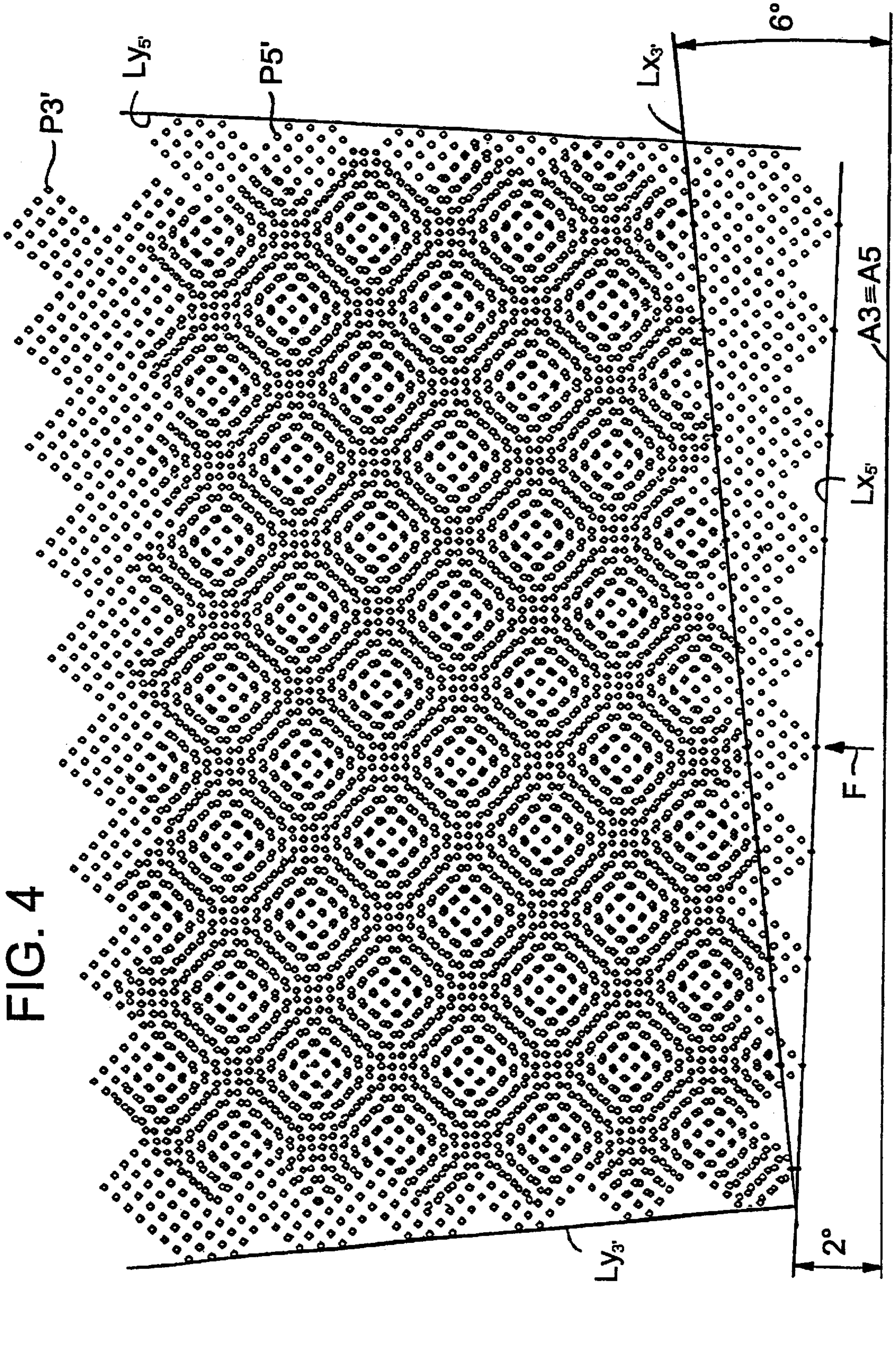
FIG. 4 is a schematic view of a portion of the two embossed and joined layers as they emerge from the embossing machine shown in FIGS. 1 to 3.
Figure 4A:
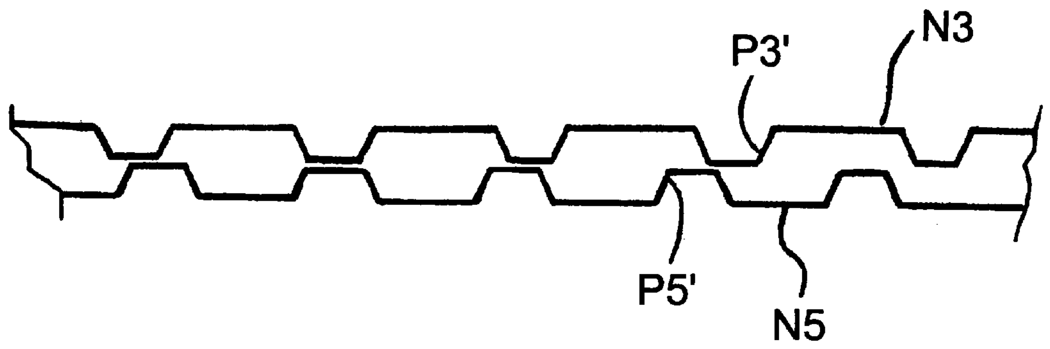
FIG. 4A shows a schematic section of the strip material in a plane perpendicular to the surface of the material and parallel to one of the directions of alignment of the protuberances.

Protuberances P3' and P5' are impressed on the two layers N3 and N5 in a pattern corresponding to that formed by the protuberances P3 and P5 on the two embossing cylinders 3 and 5 respectively. Consequently, after the two layers have been joined, there is no superimposition or coincidence of each protuberance of one layer with a corresponding protuberance of the other layer, but, as shown in FIG. 4, there is a correspondence in certain areas. The areas in which the protuberances coincide are separated from each other by areas in which the protuberances on one layer do not coincide with the protuberances of the other layer. Additionally, the areas in which the protuberances P3' and P5' coincide are aligned in two alignments which are not parallel to the axes A3 and A5 of the two embossing cylinders 3 and 5. This means that, as the two layers N3 and N5 are joined, the protuberances P3 and P5 of the two embossing cylinders come into contact gradually in the area of lamination (in other words, of joining) of the strips, with an advantageous reduction in the vibration of the machine, mechanical stresses and noise.

In FIG. 4, $LX_3'$, $Ly_3'$ and $Lx_5$, $Ly_5'$ indicate the directions of alignment of the protuberances P3' and P5' on the first and second layer respectively. The letter F indicates the direction of advance of the strip material leaving the embossing machine.

Figure 5:
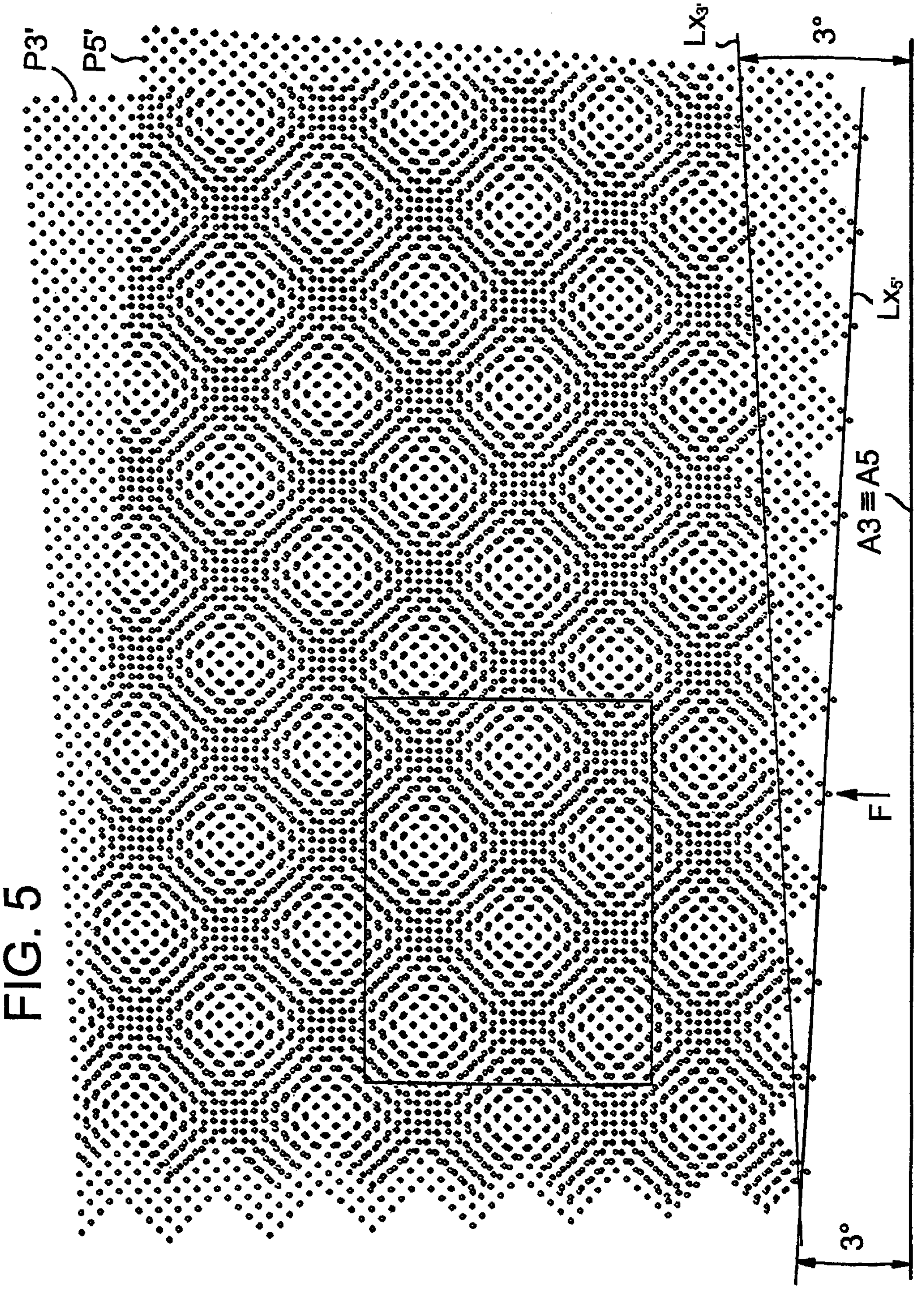
FIG. 5 is a view, similar to that in FIG. 4, of two joined layers produced by two embossing cylinders cut at the same angle.

When the two directions of alignment $Lx_3$ and $Lx_5$ are inclined at the same angle, for example $\beta_3=\beta_5=3°$, there is once again the advantage of having coincidence in certain areas of the protuberances of the joined layers N3 and NS, but the areas of coincidence are disposed in an alignment parallel to the axes of the embossing cylinders 3 and 5, as shown in FIG. 5. In this case, the advantage of a reduction in vibration is lost. However, there is the advantage of making two embossing cylinders 3 and 5 which have perfectly identical incisions (and therefore protuberances).

Figure 6:
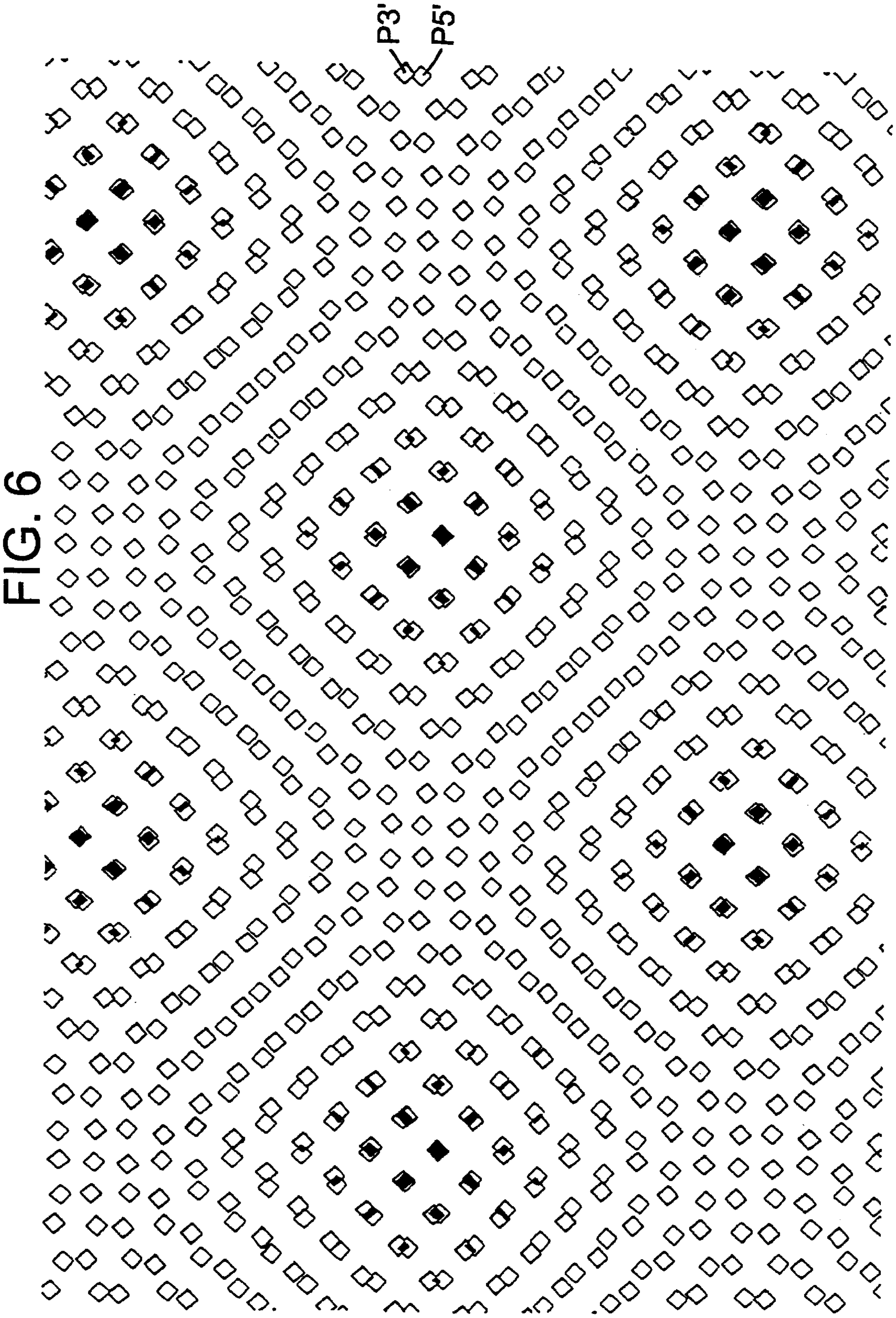
FIG. 6 shows an enlargement of a portion of FIG. 5.

FIG. 6 shows a schematic enlargement of FIG. 5, where the areas of coincidence of the protuberances P3' and P5' are clearly visible.

In the preceding text, reference has been made to protuberances of truncated pyramidal form, which are the most common. These are easily produced using simple machining processes, for example by routing. In this case, the directions of alignment advantageously coincide with the directions of the diagonals of the quadrilateral bases of the truncated pyramids. However, different forms. of protuberance are not excluded.

Additionally, the inclination characteristics described above of the directions of alignment of the protuberances may be uniform over the whole of the corresponding cylinder; in other words, the directions $LX_3$, $Ly_3$, $Lx_5$ and $Ly_5$ may have the same inclination over the whole longitudinal development of the embossing cylinder 3 or 5 respectively. However, this is not essential, and the inclination of the directions of alignment may vary gradually along the axis of the cylinder, or may vary over successive sections of the cylinder.

It should also be noted that a similar effect of partial superimposition of the protuberances P3, P5 is obtained if the two directions of alignment $Lx_3$ and $Lx_5$ are inclined in opposite directions with respect to the axes of the corresponding cylinders 3 and 5, but forming different angles with the corresponding axes.

Both in the case in which the embossing cylinders 3, 5 are made according to the illustrations in FIGS. 2–6 and in the case in which they are made with protuberances P3, P5 disposed at different intervals (so as to obtain contact between the protuberances in certain areas), in order to avoid having always the same protuberances coinciding and consequently the embossing cylinders deteriorating in certain areas only, which would rapidly cause them to become unserviceable, according to the invention the embossing cylinders have slightly different diameters. In FIG. 1, the difference in diameter between the two embossing cylinders 3 and 5 has been exaggerated for the sake of clarity in the drawing. However, for the purposes of the present invention, a very small difference in diameter is sufficient. Typically, a difference in diameter of 10–15 mm is sufficient for embossing cylinders having a diameter from 500 to 600 mm. So then, for example, it is possible to use an embossing cylinder 540 mm in diameter and an embossing cylinder 545 mm in diameter The two embossing cylinders of the present invention have a protuberance density preferably between 6 and 150 protuberances per $cm^2$, and more preferably between 10 and 60 protuberances per $cm^2$.

The two embossing cylinders are connected together mechanically by means of a pair of gears, indicated by 31 and 33 in FIG. 1A. Since, even though they have different diameters, the two cylinders have to have the same peripheral speed, it is necessary to use two gears 31, 33 having a different number of teeth, for example having a difference of one tooth between them. The gears used typically have a number of teeth in the order of 90–20. It is possible therefore to use gears having, for example, 108 and 109 teeth respectively, the gear with the smaller number of teeth being keyed to the axis of the embossing cylinder having the smaller diameter. Of course, the ratio between the diameters of the two cylinders will be determined by the ratio between the number of teeth on the two gears used. The figures given above are purely indicative.

In order to reduce wear even further, the two embossing cylinders 3, 5 may be thermostatically controlled. It has been found that, by adjusting the embossing cylinders 3, 5 in such a way that there is a gap of 0.05 mm between them when the machine is cold, this gap is eliminated, or considerably reduced, after twenty minutes of operation, owing to the radial expansion of the embossing cylinders due to the rise in temperature during operation (caused by the interaction with the pressure rollers, which generates heat on account of the cyclic compression of the covering on the pressure roller). With a thermostatic control system, for example using a constant-temperature heat transfer liquid which circulates in the embossing cylinders 3, 5, it is possible to bring the temperature of the cylinders to a steady level before the start of the operating cycle, thereby setting the correct gap between the protuberances, which then remains unchanged throughout the operation.

Additionally, or alternatively, it is possible to use a system for controlling the pressure between the embossing cylinders 3, 5 which maintains this pressure at a constant level. This system is shown schematically in FIG. 1. The second embossing cylinder 5 and the second pressure roller 9 are carried by an oscillating moving element 16, pivoted at 16A on the structure of the machine and pressed by a cylinder and piston actuator 18 against a fixed stop 20. A movable and adjustable stop 22 carried by an extension 24 of the moving element 16 interacts with the fixed stop 20. The fixed stop is provided with a load cell which sends a signal proportional to the force exerted by the moving stop 22 to the control unit. When the geometry of the system, the force exerted by the cylinder and piston actuator 18 and the force detected by the load cell on the fixed stop 20 are known, it is possible to deduce the reaction power between the two embossing cylinders 3, 5. Consequently, by keeping constant the force detected by the load cell (by the continuous adjustment of the adjustable stop 22 by means of a dedicated actuator) it is possible to keep the pressure between the embossing cylinders 3, 5 constant at a predetermined value.

It should be understood that the drawing shows only an example, provided solely as a practical demonstration of the invention, and that this invention may vary in its forms and arrangements without departing from the scope of the guiding concept of the invention. Any reference numbers in the enclosed claims have the purpose of facilitating the reading of the claims with reference to the description and to the drawing, and do not limit the scope of protection represented by the claims.

I claim:

1. An embossing and laminating method comprising the steps of:

a. embossing a first layer of strip material on a first embossing cylinder provided with a first set of protuberances between said first embossing cylinder and a first pressure roller;

b. embossing a second layer of material separately from said first layer on a second embossing cylinder provided with a second set of protuberances between said second embossing cylinder and a second pressure roller, said first and said second embossing cylinders having different diameters;

c. laminating said first and said second embossed layers in a lamination nip formed between said first and said second embossing cylinders, an adhesive being applied to at least one of said layers, the protuberances of said first and said second embossing cylinders corresponding to each other only in certain areas in said lamination nip.

2. An embossing and laminating machine comprising:

a first embossing cylinder with an axis and a surface provided with a first set of disconnected protuberances arranged along a first and a second direction of alignment inclined with respect to said axis of said first embossing cylinder;

a second embossing cylinder, having a different diameter than said first embossing cylinder, with an axis and a surface provided with a second set of disconnected protuberances arranged along a third and a fourth direction of alignment inclined with respect to said axis of second embossing cylinder, said first and said second embossing cylinders forming a nip wherein the protuberances of said first and said second sets are constructed such that in said nips some of the protuberances of said first set coincide with some protuberances of said second set, while other protuberances of said first set are out of phase with corresponding protuberances of said second set; and a first pressure roller interacting with said first embossing cylinder; and a second pressure roller interacting with said second emobossing cylinder.

3. The embossing and laminating machine according to claim 2, wherein said first set of protuberances is disposed with a first interval along lines oriented according to said first direction of alignment and with a second interval along lines oriented according to said second direction of alignment, said first and said second direction of alignment forming between them an angle other than zero;

said second set of protuberances is disposed with said first interval along lines oriented according to said third direction of alignment and with said second interval along lines oriented according to said fourth direction of alignment, said third and said fourth direction of alignment forming between them an angle approximately equal to the angle formed by said first and said second direction of alignment; and said first direction of alignment and said third direction of alignment being inclined with different inclinations with respect to the axes of the corresponding embossing cylinders.

4. The embossing and laminating machine according to claim 2, wherein keyed to the axes of the two embossing cylinders are corresponding gears which engage with each other and transmit the rotational motion from one cylinder to the other, said gears having a different number of teeth so that the two embossing cylinders of different diameters are made to rotate at the same peripheral speed.

5. The embossing and laminating machine according to claim 2, wherein said first set of protuberances is disposed with a first interval along lines oriented according to said first direction of alignment and with a second interval along lines oriented according to said second direction of alignment, said first and said second direction of alignment forming between them an angle other than zero;

said second set of protuberances is disposed with said first interval along lines oriented according to said third direction of alignment and with said second interval along lines oriented according to said fourth direction of alignment, said third and said fourth direction of alignment forming between them an angle approximately equal to the angle formed by said first and said second direction of alignment; and said first direction of alignment and said third direction of alignment being inclined with the same orientation with respect to the axes of the corresponding embossing cylinders.

6. The embossing and laminating machine according to claim 2, wherein said first set of protuberances is disposed with a first interval along lines oriented according to said first direction of alignment and with a second interval along lines oriented according to said second direction of alignment, said first and said second direction of alignment forming between them an angle other than zero;

said second set of protuberances is disposed with said first interval along lines oriented according to said third direction of alignment with said second interval along lines oriented according to said fourth direction of alignment, said third and said fourth direction of alignment forming between them an angle approximately equal to the angle formed by said first and said second direction of alignment;

and said first direction of alignment and said third direction of alignment are inclined in opposite directions with respect to the axes of the corresponding embossing cylinders and form with said axes two different angles.

7. The embossing and laminating machine according to claim 2, wherein said first set of protuberances is aligned along lines oriented according to said first direction of alignment with an interval different from that of said second set of protuberances aligned along lines oriented according to said third direction of alignment.

8. The embossing and laminating machine according to claim 2, wherein said first and said second sets of protuberances each have a density of between 6 and 150 protuberances per $cm^2$.

9. The embossing and laminating machine according to claim 2, wherein the two embossing cylinders are kept at a controlled temperature during operation.

10. The embossing and laminating machine according to claim 2 further comprising a load cell which sends a signal proportional to the pressure between the two embossing cylinders, and a control system which, on the basis of said signal, keeps the pressure between the embossing cylinders constant.

11. The embossing and laminating machine according to claim 2 wherein the two embossing cylinders are rotated at different peripheral speeds.

12. An embossing and laminating machine comprising:

a first embossing cylinder with a surface provided with a first set of arranged protuberances;

a first pressure roller coacting with said first embossing cylinder for embossing a first web;

a second embossing cylinder, having a different diameter than said first embossing cylinder with a surface provided with a second set of arranged protuberances;

a second pressure roller coacting with said second embossing cylinder for embossing a second web;

a glue applicator for applying a glue to at least one of said first and said second webs;

a lamination nip formed by said first and said second embossing cylinders, wherein the protuberances of said first and said second sets of arranged protuberances are constructed such that in said laminating nip, some of the protuberances of said first set coincide with some of the protuberances of said second set while other protuberances of said first set are out of phase with corresponding protuberances of said second set.

* * * * *